United States Patent
Schneider

(10) Patent No.: US 9,201,793 B2
(45) Date of Patent: Dec. 1, 2015

(54) FACILITATING PROFILING OF APPLICATIONS FOR EFFICIENT LOADING

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1160 days.

(21) Appl. No.: 12/156,355

(22) Filed: May 30, 2008

(65) Prior Publication Data

US 2009/0300267 A1    Dec. 3, 2009

(51) Int. Cl.
*G06F 12/08*   (2006.01)
*G06F 9/445*   (2006.01)

(52) U.S. Cl.
CPC ........ *G06F 12/0862* (2013.01); *G06F 9/44578* (2013.01)

(58) Field of Classification Search
CPC ....................................................... G06F 12/08
USPC ........................................................ 711/203
See application file for complete search history.

(56) References Cited

U.S. PATENT DOCUMENTS

| | | | | |
|---|---|---|---|---|
| 5,815,720 A | * | 9/1998 | Buzbee | 717/158 |
| 6,002,872 A | * | 12/1999 | Alexander et al. | 717/127 |
| 6,047,363 A | * | 4/2000 | Lewchuk | 711/213 |
| 7,043,524 B2 | * | 5/2006 | Shah et al. | 709/203 |
| 7,086,064 B1 | * | 8/2006 | Stevens | 719/310 |
| 2001/0034736 A1 | * | 10/2001 | Eylon et al. | 707/200 |
| 2002/0019723 A1 | * | 2/2002 | Zwiegincew et al. | 702/186 |
| 2005/0021916 A1 | * | 1/2005 | Loafman | 711/154 |

\* cited by examiner

*Primary Examiner* — Tuan Thai
*Assistant Examiner* — Gautam Sain
(74) *Attorney, Agent, or Firm* — Lowenstein Sandler LLP

(57) ABSTRACT

Systems and methods to facilitate profiling of applications for efficient loading are described. A method may include identifying a page fault during execution of an application being loaded into memory. The page fault indicates that an application part to be currently executed has not been loaded in the memory yet. The method may further include collecting page fault data associated with the page fault, and causing the page fault data to be stored in a data store for use by a profiler.

22 Claims, 4 Drawing Sheets

FACILITATING PROFILING OF APPLICATIONS FOR EFFICIENT LOADING

TECHNICAL FIELD

Embodiments of the present invention relate to loading applications into memory, and more specifically to facilitating profiling of applications for efficient loading.

BACKGROUND

Many computer programs, or applications, are very large. As a result, if the transport mechanism (e.g., network, disk drive) is slow, it may take a long time to load the application. In addition, when applications are loaded, the application may load code for features that are not necessary, before loading code that is necessary.

On modern operating systems, a program is typically brought into memory through a series of page fault operations, where each page fault is the result of attempting to access part of the program image that is been mapped from the image file, but not yet loaded into memory. Loading a program via page faults is efficient in terms of memory space. However, it is inefficient in terms of time.

Static analysis of programming code can be exploited to improve the average load time of a process, and/or minimize the number of I/O operations required just to run the program itself. In particular, the program image can be rearranged to group portions of code more efficiently. For example, if function A calls function B, the code for both functions should be in the same page. In addition, static data used by a function should be on the same page as the function itself, and a function with code and data that take less than a page of memory should not span a page boundary. Further, more frequently used functions should occur earlier in the image because file systems take less time to find, and thus load, the data from the beginning of a file than the data at the end of the file. However, the static analysis does not provide sufficient information for optimization of programs. For example, the static analysis does not determine which functions will be called during any particular invocation of a program.

Dynamic analysis such as profiling can also be used to analyze programs. A profiler is a tool that investigates a program's behavior using information gathered as the program runs. However, gathering of this information usually requires building or rebuilding the program, which has several limitations. In particular, when the application is rebuilt to provide the profiling information, the application is generally slower, and the functions are generally larger than they otherwise would have been.

BRIEF DESCRIPTION OF THE DRAWINGS

The present invention is illustrated by way of example, and not by way of limitation, in the figures of the accompanying drawings and in which.

DETAILED DESCRIPTION

Figure 1:
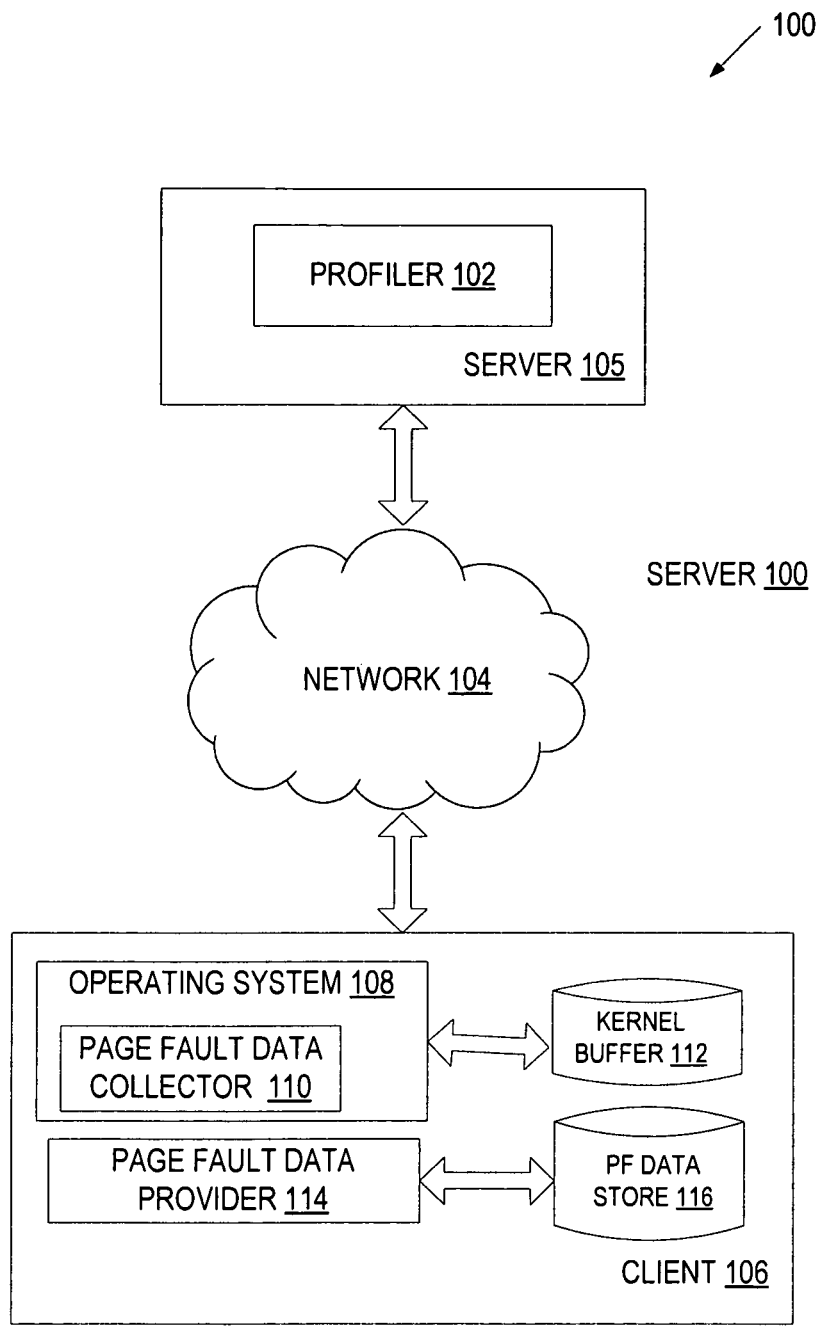
FIG. 1 is a block diagram of an exemplary network architecture in which embodiments of the invention may operate.

Described herein are systems and methods to facilitate profiling of applications for efficient loading. An application can be loaded into memory of a computing device through a series of page fault operations. Each page fault occurring during the execution of the application is the result of attempting to access a part of the application image that has been mapped from the image file but not yet loaded into memory. In one embodiment, an operating system of the computing device identifies a page fault during the execution of the application, and collects data associated with the page fault. This page fault data may include, for example, the address that caused the page fault, the name of the process that caused the page fault, the name of the image file, and the offset of the image used to satisfy the page fault. The operating system causes the collected page fault data to be stored in a data store.

In one embodiment, a profiler accesses the data store to retrieve the page fault data, and profiles the application using the page fault data. In particular, the profiler may determine a preferred sequence of sub-routines and data within the application image for efficient loading. The profiler may then optimize the application based on the profiling. The application can be optimized by predictively prefetching portions of the application for loading, or by rearranging the sub-routines and data and rebuilding the application based on the profiling.

One advantage of profiling an application is the certainty gained in rearranging the code of the application compared with static profiling. In addition, the size of some applications may be decreased (e.g., 10-15% reduction) with profiling, and/or the amount of bandwidth needed to load an application across a network may be reduced (e.g., gigabytes or terabytes of bandwidth reduction) with profiling. Furthermore, profiling minimizes the number of I/O operations required to run a program, thereby improving the average load time of a process.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "comparing", "hashing", "maintaining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more a specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary network architecture 100 in which embodiments of the present invention may operate. The illustrated network architecture 100 includes a network 104, a server 105 and one or more client devices including, for example, a client 106. The client device 106 may be, for example, a personal computer (PC), a mobile phone, a palm-sized computing device, a personal digital assistant (PDA), and the like. The client device 106 includes one or more hardware components, software components, or a combination of both, that are configurable. The client device 106 is coupled to the server 105 via the network 104, which may be a public network (e.g., Internet) or a private network (e.g., Ethernet, a Local Area Network (LAN), or a corporate intranet).

The client device 106 may host an operating system 108 and one or more applications. An application may be loaded into memory of the client 106 via a series of page fault operations occurred during the execution of the application. In particular, when a processor of the client 106 loads the application into memory, the application is not loaded entirely at once. Instead, only enough code to start the application and pointers to the code that will be needed are read into memory. When the processor starts executing the application 330, the processor often needs code that has not been loaded into memory yet. An attempt to access a part of an application image that has been mapped from the image file but not yet loaded into memory causes a page fault.

When a page fault occurs, the operating system 108 (e.g., a page fault handler of the operating system 108) determines what page of the application image is needed to satisfy the page fault, brings this page into memory, and restarts the instruction that caused the page fault. The application image may be loaded from a secondary storage device of the client 106, or across the network 104 from the server 105 or some other server (not shown).

In one embodiment, the operating system 108 includes a page fault data collector 110 that collects data associated with the page fault and stores this page fault data in a kernel buffer 112. The page fault data may include, for example, the address that caused the page fault, the name of the process that caused the page fault, the name of the image file, and the offset of the image used to satisfy the page fault.

In one embodiment, the client 106 also hosts a page fault data provider 114 that checks the kernel buffer 112 and writes its contents to a page fault data store 116. The page fault data provider 114 can check the kernel buffer 112 periodically, at predetermined time intervals, or upon receiving a request from the page fault data collector 110 (e.g., when the size of the buffer 112 exceeds a threshold). The page fault data store 116 may comprise a mass storage device, such as a magnetic or optical storage based disk or tape.

The page fault data store 116 may store page fault data for all applications running on the client 106. In one embodiment, each new instance of a program starts a new data collection process performed by the page fault data collector 110. The page fault data provider 114 can combine data associated with multiple instances of the program to create statistics for each program, and store it in the page fault data store 116.

In one embodiment, the page fault data provider 114 sends the page fault data to a profiler 102 hosted by the sever 105. The page fault data provider 114 may send the page fault data to the profiler 102 at predetermined intervals or upon receiving a request from the profiler 102. In addition, the profiler 102 may receive the page fault data pertaining to the application from multiple clients executing this application. The profiler 102 uses this dynamically collected data to profile the application. In particular, the profiler 102 may determine a preferred sequence of sub-routines and data within the application image for efficient loading. The profiler 102 may then optimize the application based on the profiling. The application can be optimized by predictively prefetching portions of the application for loading, or by rearranging the sub-routines and data and rebuilding the application.

The collection of the page fault data, and the profiling and optimization of the application can be iterated until further improvements are deemed unlikely (e.g., until no additional page faults or an acceptable number of page faults occurs during loading of the application).

In an alternative embodiment (not shown), the profiler 102 may be hosted by the client 106 or another device having access to the page fault data store 116. In this alternative embodiment, the profiler 102 may retrieve page fault data from the data store 116 and use it for profiling and optimizing as discussed above.

The collection of page fault data and associated profiling can be used with both application image files and library image files. Because the library image files are shared by multiple processes, the amount of data required for analysis of a library image may be larger and/or the analysis may be more extensive.

Figure 2:
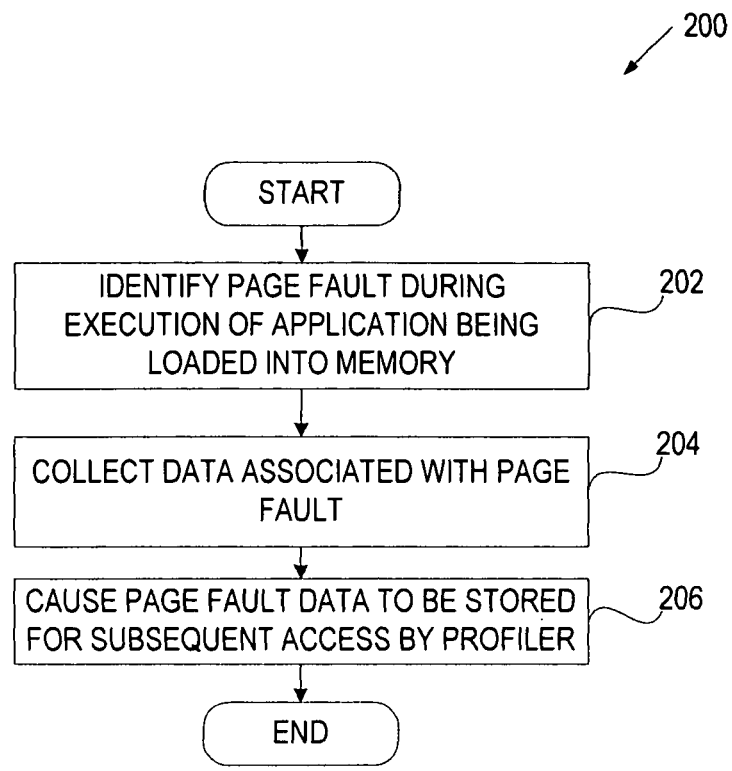
FIG. 2 is a flow diagram of one embodiment of a method to provide page fault data for use by a profiler.

FIG. 2 is a flow diagram of one embodiment of a method 200 for collecting page fault data. The method may be performed by processing logic that may comprise hardware (e.g., circuitry, programmable logic, microcode, etc.), software (such as instructions run on a processing device), or a combination thereof. In one embodiment, the method 200 is performed by a client device (e.g., client 106 of FIG. 1). Referring to FIG. 2, method 200 begins with processing logic identifying a page fault during the execution of an application whose image is being loaded into memory (block 202). The page fault indicates that a part of the application to be currently executed has not been loaded into memory yet.

At block 204, processing logic collects data associated with the page fault. This page fault data may include, for example, the address that caused the page fault, the name of the process that caused the page fault, the name of the image file, and the offset of the image used to satisfy the page fault. This page fault data may be available in various places (e.g., in the kernel, in the process image in memory, on the stack of the page fault exception handler, etc). For example, the address of the faulting instruction whose execution caused the exception and the target address that the running process was attempting to read from or write to are transiently available to the page fault handler. The page fault handler may also be able to distinguish between a read attempt for data and a read attempt for executable code (this data may be provided to the handler by the OS kernel, or it may be provided by the CPU). Alternatively, the page fault handler may be able to determine this information by looking at the memory image of the faulting process and mapping machine instruction bytes to fault types. The process name is maintained by the kernel, as well as the image name. In addition to the image name, the kernel also tracks the base relocation address for the image, which is the address added to virtual offsets within the image to provide the application address where pages get loaded. For example, if you have an application that has pages with virtual offsets of 0x0000, 0x5000, and 0x6000, and the image is loaded at application address 0x4fe70000, the third page would get loaded at 0x4fe76000.

In one embodiment, processing logic also traces back the stack of the application (e.g., the stack of the faulting process), determines from the stack which sub-routines have preceded the sub-routine that caused the current page fault, and finds the address of these sub-routines in the information available on the stack. In one embodiment, the above operations involving finding the subroutines in the stack backtrace are performed by an offline tool, rather than during the page fault process. In yet alternative embodiment, processing logic only collects the return addresses, and the offline tool subsequently matches the addresses to subroutine names.

At block 206, processing logic causes the above page fault data to be stored in a data store for use by a profiler. In particular, in one embodiment, processing logic stores the page fault data in a kernel buffer (or any other temporary data structure) and then copies the contents of the kernel buffer to a permanent data store (e.g., periodically or when the size of the buffer exceeds a threshold). Alternatively, processing logic may not use the kernel buffer but rather store the page fault data directly in the permanent data store.

In one embodiment, the profiler can be configured to obtain specific pieces of the page fault data. For example, a lightweight profiler can just obtain the execution and target addresses, the application name, and the image name (to conserve memory, the application and image names may be saved once, and references may be stored as indexes into a table of names). In conjunction with a linker map that records the address of subroutines and variables in an image file, and a list of relocation addresses for loaded images, this data provides sufficient inferences about the chain of execution. In another example, a more capable profiler may also obtain a copy of the executing process' stack at the time of the page fault. This may result in copying a large amount of data, however. To cut down on the amount of data being copied, the page fault handler may track a "high-water" mark for the stack by setting the bits in the page map for the stack to mark them read-only. This will result in a page fault whenever the process attempts to store items on the stack. The page fault handler can just reset the read-only bit (making the stack writable by the running process) when it handles this particular page fault. When a page fault indicates an attempt to demand-load an image page, the page fault handler can merely copy the stack pages that are no longer read-only (up to the current stack pointer, and setting the pages to be read-only once again). Even when the page fault profiler only copies "dirty" stack pages, this profiler would generate a large volume of data. Hence, the kernel buffer for profiler data has to be large, and the contents of this buffer need to be copied to a permanent storage more frequently.

Figure 3:
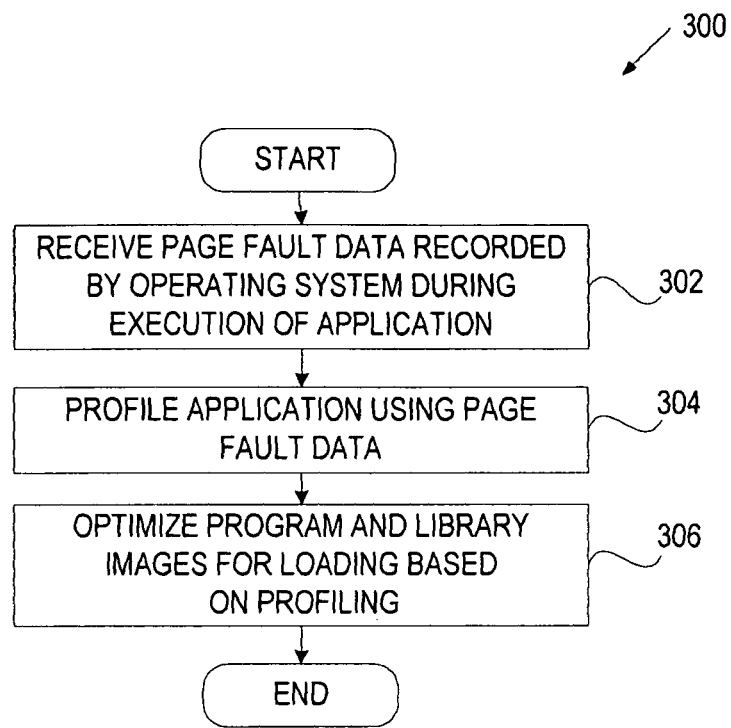
FIG. 3 is a flow diagram of one embodiment of a method for optimizing a program based on page fault data.

FIG. 3 is a flow diagram of one embodiment of a method 300 for profiling an application using page fault data. The method may be performed by processing logic that may comprise hardware (e.g., circuitry, programmable logic, microcode, etc.), software (such as instructions run on a processing device), or a combination thereof. In one embodiment, the method 300 is performed by a profiler (e.g., profiler 102 of FIG. 1).

Referring to FIG. 3, method 300 begins with processing logic receiving page fault data recorded by the operating system during the execution of an application being loaded into memory (block 202). As discussed above, the page fault data was recoded when the operating system handled a page fault caused by an attempt to access a part of the program image that was mapped from the image file but not yet loaded into memory.

At block 304, processing logic profiles the application based on the page fault data. In one embodiment, the profiling includes determining a preferred sequence of sub-routines and data within the application image that would facilitate an efficient loading of the application into memory.

At block 306, processing logic optimizes the application based on the profiling. The application can be optimized by predictively prefetching portions of the application for loading, or by rearranging the sub-routines and data and rebuilding the application based on the profiling.

Figure 4:
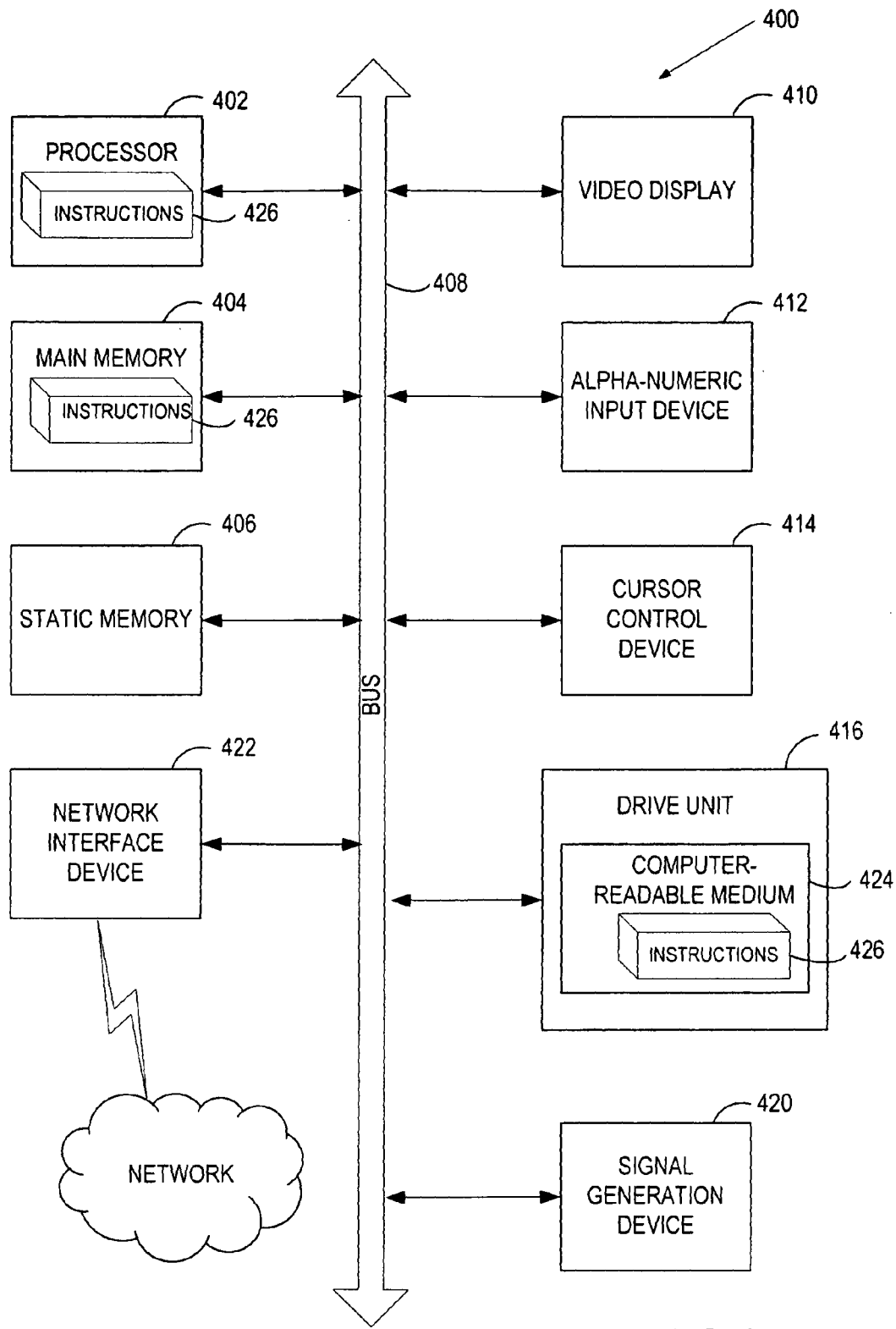
FIG. 4 illustrates a diagrammatic representation of a machine in the exemplary form of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The secondary memory 418 may include a machine-readable storage medium (or more specifically a computer-readable storage medium) 431 on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-readable storage media. The software 422 may further be transmitted or received over a network 420 via the network interface device 408.

While the machine-readable storage medium 431 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    identifying, by an operating system, a page fault during an execution of an application being loaded into a memory while the execution of the application is not being analyzed by a profiler, the page fault indicating that a part of one or more images of the application being currently executed has not been loaded into the memory yet;
    collecting, by the operating system, page fault data associated with the page fault, and storing the page fault data in a kernel buffer, the page fault data identifying the part of the one or more images used to satisfy the page fault, wherein the page fault data is collected by a page fault data collector of the operating system while the execution of the application is not being analyzed by the profiler;
    periodically writing, by a processing device executing the operating system, the page fault data from the kernel buffer to a data store for subsequent profiling of the application by the profiler, the page fault data causing the profiler to determine a preferred sequence of subroutines within the one or more images of the application for loading of the application into the memory; and
    iteratively repeating, by the operating system, the collecting of the page fault data, the storing of the page fault data in the kernel buffer and the writing of the page fault data from the kernel buffer to the data store for the profiler, wherein the collecting, the storing and the writing are iteratively repeated by the operating system until a profiler-determined preferred sequence of the sub-routines within the one or more images of the application results in not more than N number of page faults occurring during the loading of the application.

2. The computer-implemented method of claim 1, wherein the page fault data comprises one or more of an address that caused the page fault, an identifier of a process that caused the page fault, a name of an image file, or an offset of the image used to satisfy the page fault.

3. The computer-implemented method of claim 1, further comprising:
    tracing back a stack of the application to identify a set of subroutines preceding a subroutine that caused the page fault; and
    storing an identifier of each of the subroutines from the set and an address of each of the subroutines from the set in the data store for use by the profiler.

4. The computer-implemented method of claim 1, wherein the image of the application is loaded by a client across a network from a server.

5. The computer-implemented method of claim 4, further comprising:
    transmitting the page fault data to the server.

6. The computer-implemented method of claim 1, wherein the image of the application is loaded from a local secondary storage device.

7. A method comprising:
    receiving, by a profiler, page fault data pertaining to a prior execution of an application being loaded into memory, the page fault data being recorded by an operating system when a part of one or more images of the application being executed was not loaded into the memory, wherein the page fault data was collected and written to a kernel buffer by a page fault data collector of the operating system while the execution of the application was not analyzed by the profiler, and wherein the page fault data was periodically written from the kernel buffer to a data store for the profiler;

analyzing, by the profiler, the page fault data to profile the application, wherein profiling of the application comprises determining a preferred sequence of sub-routines within the one or more images of the application for loading of the application into the memory; and optimizing the application for the loading based on the profiling, wherein receiving and analyzing of the page fault data and optimizing the application are iterated until a profiler-determined preferred sequence of the sub-routines within the one or more images of the application results in not more than N number of page faults occurring during the loading of the application.

8. The computer-implemented method of claim 7, wherein the page fault data comprises one or more of an address that caused the page fault, an identifier of a process that caused the page fault, a name of an image file, or an offset of the image used to satisfy the page fault.

9. The computer-implemented method of claim 7, further comprising:
receiving stack data identifying a set of subroutines preceding a subroutine that caused the page fault, the stack data comprising an address of each of the subroutines from the set.

10. The computer-implemented method of claim 7, wherein the page fault data is received via a network from one or more clients that executed the application.

11. The computer-implemented method of claim 7, wherein optimizing the application for loading comprises:
predictively prefetching portions of the application for loading based on the profiling.

12. The computer-implemented method of claim 7, wherein optimizing the application for loading comprises:
rebuilding the application based on the profiling.

13. A computer system comprising:
a memory;
a processor, coupled to the memory, to execute an application whose image is being loaded into the memory; and
an operating system, executed from the memory by the processor, to:
identify a page fault when the application is executing, the page fault indicating that a part of one or more images of the application being currently executed has not been loaded into the memory yet, wherein the page fault was identified while the execution of the application was not analyzed by a profiler;
collect page fault data associated with the page fault, and store the page fault data in a kernel buffer, the page fault data identifying the part of the one or more images used to satisfy the page fault, wherein the page fault data was collected while the execution of the application was not analyzed by the profiler;
periodically write the collected page fault data from the kernel buffer to a page fault data store for subsequent profiling of the application by the profiler, the page fault data causing the profiler to determine a preferred sequence of sub-routines within the one or more images of the application for loading of the application into the memory; and
iteratively repeat collecting the page fault data, storing the page fault data in the kernel buffer and writing the page fault data from the kernel buffer to the data store for the profiler,
wherein collecting, storing and writing of the page fault data are iterated until a profiler-determined preferred sequence of the sub-routines within the one or more images of the application results in not more than N number of page faults occurring during the loading of the application.

14. The system of claim 13, wherein the page fault data comprises one or more of an address that caused the page fault, an identifier of a process that caused the page fault, a name of an image file, or an offset of the image used to satisfy the page fault.

15. The system of claim 13, further comprising an offline tool to trace back a stack of the application to identify a set of subroutines preceding a subroutine that caused the page fault, and to store an identifier of each of the subroutines from the set and an address of each of the subroutines from the set in the data store for use by the profiler.

16. The system of claim 13, wherein the image of the application is loaded from a server across a network.

17. The system of claim 13, further comprising a local secondary storage device to store an image of the application being loaded.

18. The system of claim 13, further comprising:
a profiler to receive the page fault data, to profile the application using the page fault data, and to optimize the application for loading based on the profiling.

19. A non-transitory computer readable storage medium having instructions stored thereon that, when executed by a processing system, cause the processing system to perform a method comprising:
identifying, by an operating system, a page fault during an execution of an application being loaded into a memory while the execution of the application is not being analyzed by a profiler, the page fault indicating that a part of one or more images of the application being currently executed has not been loaded into the memory yet;
collecting, by the operating system, page fault data associated with the page fault, and storing the page fault data in a kernel buffer, the page fault data identifying the part of the one or more images used to satisfy the page fault, wherein the page fault data is collected by a page fault data collector of the operating system while the execution of the application is not being analyzed by the profiler;
periodically writing, by a processing device executing the operating system, the page fault data from the kernel buffer to a data store for subsequent profiling of the application by the profiler, the page fault data causing the profiler to determine a preferred sequence of sub-routines within the one or more images of the application for loading of the application into the memory; and
iteratively repeating the collecting of the page fault data, the storing of the page fault data in the kernel buffer and the writing of the page fault data from the kernel buffer to the data store for the profiler, wherein the collecting, the storing and the writing are iteratively repeated by the operating system until a profiler-determined preferred sequence of the sub-routines within the one or more images of the application results in not more than N number of page faults occurring during the loading of the application.

20. The computer readable storage medium of claim 19, wherein the page fault data comprises one or more of an address that caused the page fault, an identifier of a process that caused the page fault, a name of an image file, or an offset of the image used to satisfy the page fault.

21. The computer readable storage medium of claim 19, wherein the method further comprises:

tracing back a stack of the application to identify a set of subroutines preceding a subroutine that caused the page fault; and storing an identifier of each of the subroutines from the set and an address of each of the subroutines from the set in the data store for use by the profiler.

22. The computer readable storage medium of claim 19, wherein the image of the application is loaded across a network from a server or from a local secondary storage device.

* * * * *